July 29, 1924.

W. B. ENSIGN

GOVERNOR VALVE

Filed April 7, 1922

WITNESSES
Edw. Thorpe
A. L. Kitchin

INVENTOR
W. B. Ensign
BY
ATTORNEYS

July 29, 1924.

W. B. ENSIGN

GOVERNOR VALVE

Filed April 7, 1922

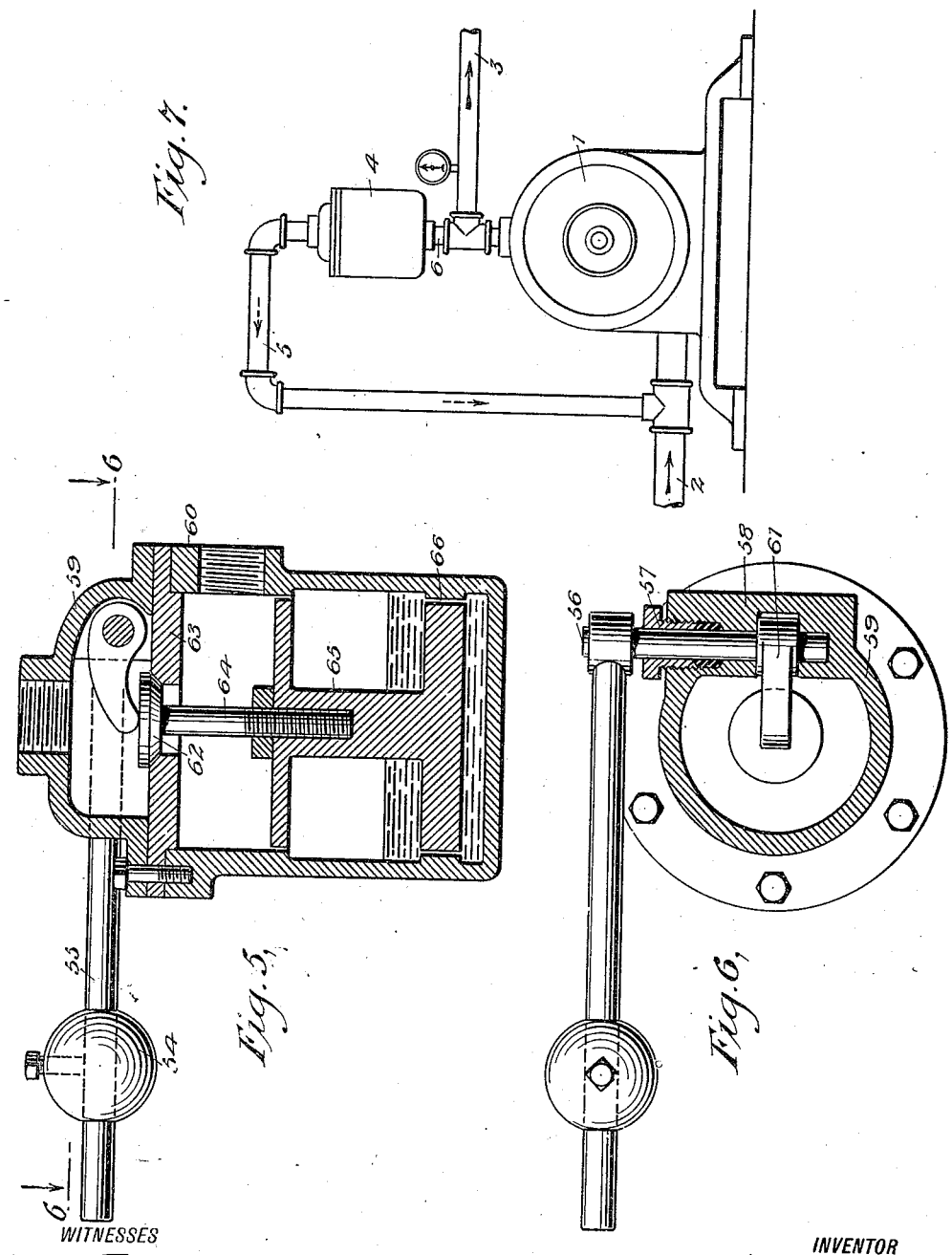

Patented July 29, 1924.

1,503,357

UNITED STATES PATENT OFFICE.

WILLIAM B. ENSIGN, OF NEW YORK, N. Y.

GOVERNOR VALVE.

Application filed April 7, 1922. Serial No. 550,508.

*To all whom it may concern:*

Be it known that I, WILLIAM B. ENSIGN, a citizen of the United States, and a resident of the city of New York, borough of the Bronx, in the county of Bronx and State of New York, have invented a new and Improved Governor Valve, of which the following is a full, clear, and exact description.

This invention relates to governor valves of a special construction which may be set to maintain a constant pressure in a pipe line regardless of the load.

The invention also relates to governor valves which will not only act as means for causing a constant pressure in a pipe line but as a valve for maintaining a constant rarefaction.

The object of the invention is to provide a governor valve which will constantly maintain a given pressure in a pipe line by relieving that line automatically when the pressure begins to build up beyond that at which the valve is set.

A further object of the invention is to provide a constant pressure valve capable of automatic action when in use and formed to be readily set for different pressures.

An additional object is to provide a constant pressure governor valve which is designed to have an enclosing casing with adjustments for the valve mechanism arranged either exteriorly or interiorly.

In the accompanying drawings—

Figure 5 is a view similar to Figure 1 but showing a modified structure wherein the valve may be adjusted from a point exterior of the casing.

Figure 6 is a sectional view through Figure 5 on line 6—6.

Figure 7 is a side view of a constant pressure pump, a constant pressure governor valve constructed according to the invention and associated connecting pipes for indicating the flow of fluid under varying conditions.

Figure 1:
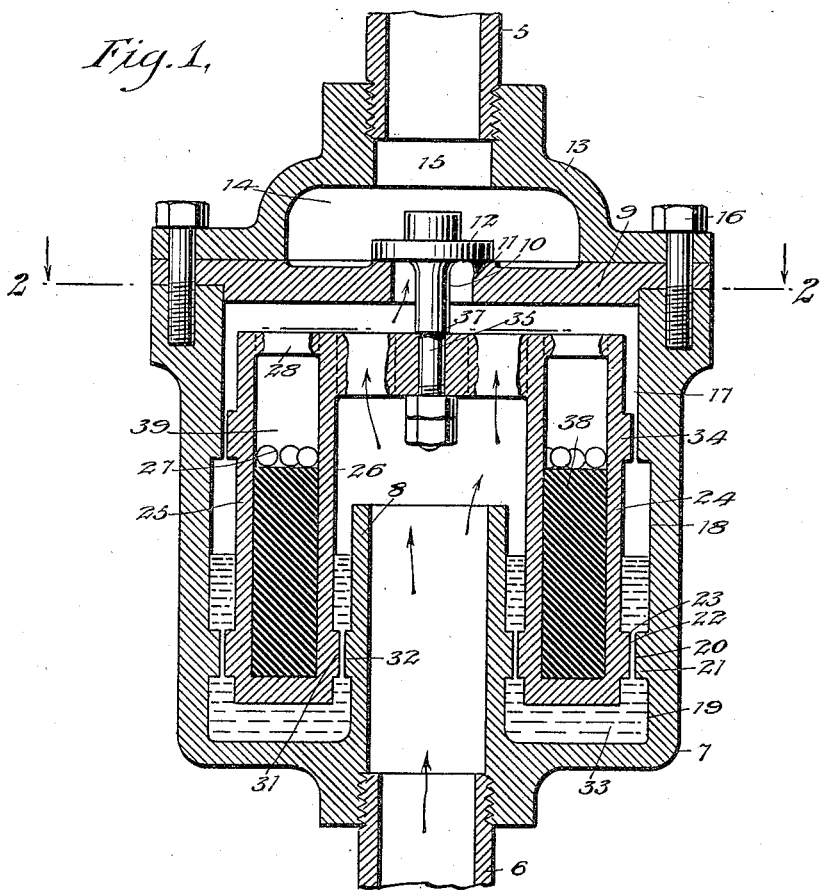
Figure 1 is a longitudinal vertical section through a governor valve disclosing one embodiment of the invention.

Referring to the accompanying drawings by numeral, 1 indicates a constant pressure pump (Fig. 7) which pumps any desired fluid, as for instance, gas from a supply main 2. In action, it is desired that pump 1 contain a constant pressure in the feed pipe 3 and as is well known, the usual gas supply lines 2 do not maintain a constant pressure but vary with the load thereon. The pipe 3 is designed to supply burners or other gas consuming devices which require a constant pressure of gas to produce the best results.

In some factories and elsewhere, it has been found that the usual city gas supply main 2 does not provide gas at the desired pressure so that it must be boosted by a pump 1. The various devices using the gas from the constant pressure line 2 may be turned on and off as desired but the pressure in pipe 3 must remain constant as the remaining burners require a certain predetermined pressure. Unless a governor valve 4 was provided to maintain this constant pressure, pump 1 would immediately build up an extra pressure in the line 3 in case one of the burners or gas consuming devices was turned off.

Heretofore, different regulating governors were provided to maintain as near as possible a constant pressure in the pipe 3 with the pump 1 giving a constant volume. These various devices which have been known heretofore, have been found more or less faulty in not quickly responding to the changing in load on pipe 3. To overcome this defect and to provide certain other advantages, the governor valve 4 has been provided which may be set to maintain a constant pressure in line 3 and when once set is very sensitive so that the least tendency to a rise in pressure will cause a response. This response results in the opening of the valve to the return or by-pass 5, said by-pass being connected to the pipe 2 or if desired discharged into the atmosphere.

It will be noted that the discharge port of pump 1 is connected to the lower part of valve 4 and the upper part of valve 4 is connected to pipe 5 while the line 3 is connected to the pipe 6 which connects the port of pump 1 with valve 4. The valve 4 is constructed as shown in detail in Figures 1 and 2. It will be noted that in both of these figures a structure has been presented which discloses to the eye merely a casing when viewed from the outside or so that no one can disturb the adjustment without taking the casing apart. This will prevent unauthorized or careless adjustment.

Figure 2:
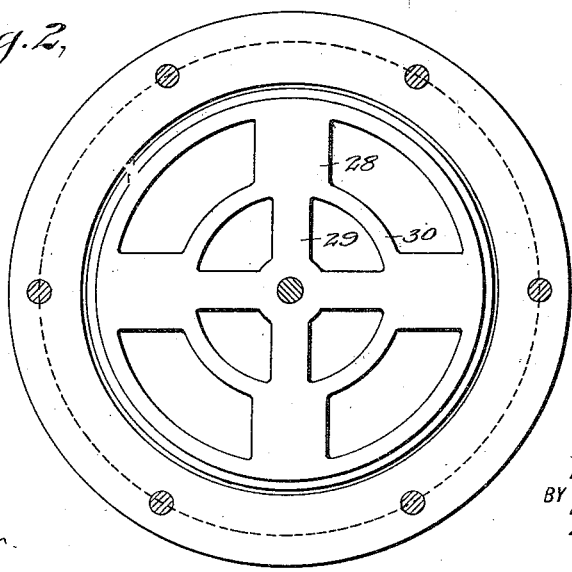
Figure 2 is a sectional view through Figure 1 on line 2—2.

As shown in Figure 1, the pipe 6 is threaded into the casing 7 and discharged into an inwardly extending tubular member 8. The casing 7 at the upper end carries a removable valve plate 9 having an opening 10 formed with a seat 11 designed to receive the valve disk 12. A cap or cover 13 rests on the plate 9 and is provided with a hollowed out portion or chamber 14 merging into a central outlet 15, said outlet discharging into the pipe 5. Any desired number of machine screws 16 are provided for clamping the cap or cover 13 and plate 9 to the upper end of the casing 7. The casing 7 is provided with an upper bore 17 of certain diameter, an intermediate bore 18 of a greater diameter and a lower or end bore 19 of a diameter equal to the bore 18 while a bore 20 separates the bores 18 and 19, bore 20 being of the same diameter as bore 17. The resulting structure caused by the bores 18 and 19 presents an annular bead 21 having a flat surface or bore 20 engaging the flat annular surface 22 on the annular bead or projection 23 of the valve piston 24. The valve piston 24 is preferably constructed from one piece though it may be made from a number of pieces and secured together, said valve piston being formed with spaced annular walls 25 and 26 whereby an annular chamber 27 is arranged therebetween, said walls being connected by spokes or webs 28 which merge into these walls while the wall 26 merges into spokes 29 and arc-shaped sections 30, said spokes and arc-shaped sections forming a supporting and connecting spider for the walls 25 and 26. The wall 26 is provided with an annular bead or projection 31 co-acting with an annular bead or projection 32 formed on the tubular member 8 whereby when the oil or other liquid 33 is arranged in the casing as shown in Figure 1 the parts will act as a dash-pot for checking the sudden movement of the valve piston 24. An annular projection or bead 34 is provided on the wall 25 near the upper end which co-acts with the bore 17 while the lower beads heretofore described, co-act for guiding the valve piston 24 in its reciprocatory motion which motion is checked or dampened by the structure acting as a dash-pot. The valve piston 24 is connected to the valve disk 12 by a suitable projection 35 which is threaded and held in place by suitable nuts 36 which nuts act to clamp the shoulder 37 firmly against piston 24 so that the parts will act in unison and as if they were made in one piece.

Arranged in the piston 24 is a substance 38 acting as a weight, said substance being lead or other suitable heavy material. It is also designed to have separate articles 39 arranged on top of the weight 38 according to the pressure desired in the line 3. The articles 39 may be lead balls or other suitable material and said balls may be added in any desired quantity to secure the proper weight for holding the valve disk of plate 12 on its seat until a certain pressure has been secured in line 3.

As an example, if the pressure in line 3 was to be eight pounds, the material 38 and the articles 39 together with the piston 24 including the disk 12, must be of such a weight that any pressure about eight pounds will cause the valve disk of plate 12 to move off its seat. It will be, of course, understood from an examination of Figure 1 that the pressure in the tubular member 8 is the same as in pipe 3 and that the fluid readily passes through the spider forming members 29 and 30 so as to continually act on the valve disk of plate 12 and to raise said disk together with its piston 24 immediately upon an increase of pressure beyond the pressure at which the piston has been set.

Figure 3:
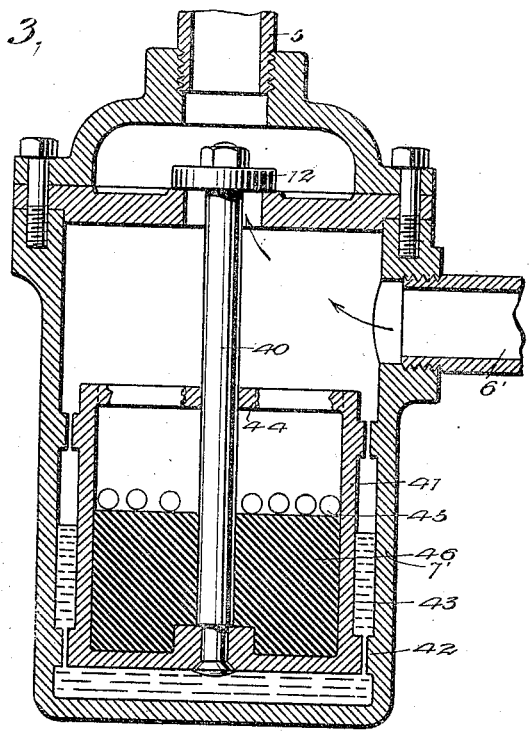
Figure 3 is a view similar to Figure 1 but showing a modified structure.

In Figure 3, a modified construction of valve is shown to that illustrated in Figure 1, said modification accomplishing the same results. In this form of the invention the inlet 6' is near the top of the casing 7' while the rod or bar 40 extends from the valve disk 12 for almost the full length of the casing where it is secured to the bottom part of the piston 41 which piston operates in the lower part of the casing instead of substantially filling the entire casing as shown in Figure 1. In this form of the invention a number of guiding beads or annular projections 42 are provided both on the piston and on the casing so that the piston 41 acting in the casing with the oil 43 will produce a dash-pot effect. A spider structure 44 is provided at the upper end of the piston 41 for holding the rod 40 in proper place and at the same time permitting additional articles 45 to be added to the weight 46 so as to adjust the valve to permit any desired pressure in line 6'. When the pressure begins to build up beyond that designed, the valve disk 12 will begin to raise and will lift the piston 41 and will remain elevated as long as necessary to permit fluid to escape through the outlet or by-pass 5. It will be noted that a weighted structure is provided in this form of the invention as well as that shown in Figure 1 and, consequently, the closing action is always the same with a given weight which is not true with a spring acting valve. By reason of the use of the weight, the pressure is automatically relieved when it increases even to a very slight extent and the relief is in proportion to the increase in pressure so that in pipe 6' a constant pressure is maintained.

Figure 4:
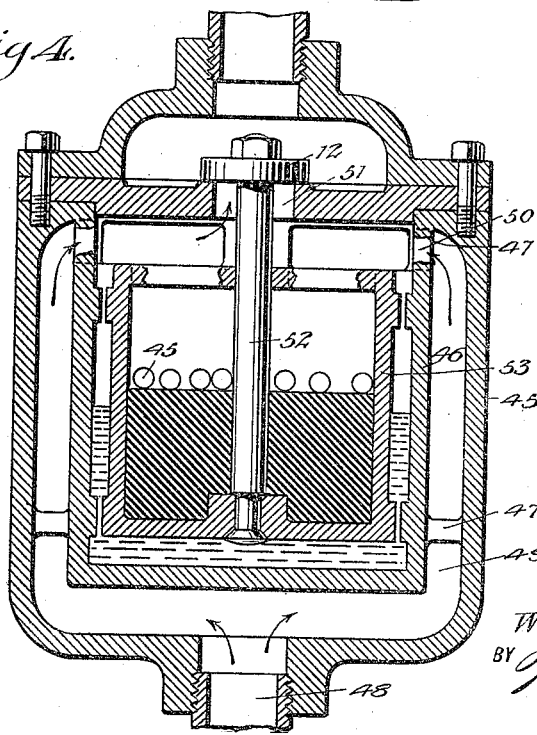
Figure 4 is a view similar to Figure 3 but showing a modified construction thereof.

In Figure 4 a further modified form of the invention is shown in which the casing 45 is cast with an inner shelf 46 connected to the casing by suitable connecting bars 47 whereby the fluid, as for instance, gas may pass in the inlet 48 and around through the space 49 to the upper end of the casing and from thence through the openings 50. The gas or other liquid passing in this manner will find its way through the opening 51 so as to act upon the valve disk 12 for raising the same from its seat when the pressure begins to build up beyond a certain point. The valve disk 12 is connected through a bolt or shaft 52 with the piston 53 which is constructed similar to the piston 41 shown in Figure 3.

It will be noted that in the preferred form of the invention as shown in Figure 1, the gas passes through the center of the piston directly to the disk valve 12 while in Figure 3 the gas passes above the piston and in Figure 4 the gas passes around the piston through suitable chambers provided in the walls of the casing. In all of these forms of the invention, the weighted member is provided for maintaining the disk valve closed.

In Figures 5 and 6 an additional form of the invention is shown wherein the weight 54 is adjustably clamped to the rod 55 for varying the torsion of said rod on the shaft 56 to which it is rigidly secured. The shaft 56 extends through a suitable packing box 57 into enlargements 58 of the cover 59 secured to the casing 60. An arm 61 is rigidly secured to shaft 56 and extends to a point positioned substantially centrally of the valve 62 normally resting on a seat provided in the plate 63. The valve 62 is provided with a threaded stem 64 screwed into a weight 65 which acts also as a piston in respect to the bottom part of the casing 6 and the annular projection 66 whereby a dash-pot structure is produced for slowing down the opening and closing movement of the valve 62.

In the forms of the invention shown in Figures 1 to 4 inclusive, the cover or cap must be removed and additional weight supplied or taken away for varying the action of the valve whereas in the form shown in Figures 5 and 6 a greater or less constant pressure may be maintained in line 3 by adjusting the weight 54 along the bar 55. Where the valve is used in a vacuum system and rarefaction is desired, this adjustment is sometimes desirable as well as desirable in other situations.

The provision of the weighted valve structure and particularly the dash-pot feature results in the rotation of a non-chattering, nonfluctuating piston pressure relief or governor valve which may be adjusted exteriorly or interiorly of the casing. It will be noted that the weight cannot be carried away by the action of the gas or other influences and that the dash-pot feature is substantially a non-leakable structure without packing and without friction loss.

What I claim is:—

1. A constant pressure valve, comprising a valve seat, a valve member adapted to rest on said seat, a weight for normally holding said valve member on said seat and for causing the same to be re-seated, a casing enclosing said weight, valve member and seat said casing being provided with an inlet on one side of said seat and an outlet on the opposite side and means co-acting with said casing for receiving oil and part of said weight whereby a dash-pot structure will be provided, which dash-pot structure acts to make the action of said valve more smooth.

2. A constant pressure governor valve, comprising a valve casing open at the top and adapted to contain liquid in the bottom part, said valve casing having an inlet opening, a cap or cover for the upper part of said casing, said cap having an outlet, a plate arranged between said cap and the casing formed with an opening extending therethrough, and a valve seat surrounding said opening, a valve member resting on said seat, and a weight connected with said valve member and projecting into said liquid, the effective action of said weight on the valve member being varied by the depth of liquid in the casing.

3. In a constant pressure governor valve, a valve member, a weight acting to close said valve member, and confined liquid continually acting to vary the effective action of said weight on the valve member.

4. In a constant pressure governor valve, a valve member, a weight for seating said valve member acting as the piston in a dash-pot, said weight being formed with a chamber for receiving additional members acting as additional weight, and means co-acting with said weight carrying liquid for receiving the lower part of said weight.

5. In a constant pressure governor valve, a casing having an inlet at the bottom, said casing having a tubular member extending from said inlet for discharging the incoming fluid at a point above the bottom of the casing, said casing being adapted to receive a quantity of oil having a level below the upper end of said tubular member, a ring-shaped piston arranged in said casing and positioned so that part of the same will surround said tubular member and be submerged in said oil, means forming a valve seat connected to the casing and arranged above said piston, a valve member arranged on said seat, means for connecting said valve member with said piston, and means for directing to a discharge point fluid passing said valve member.

6. In a governor valve, a valve disk and seat, a casing acting as a dash-pot, a weight connected to said valve disk acting as a dash-plunger arranged in said casing, means for connecting said seat with the casing and means capable of insertion in said plunger for increasing the weight thereof, said casing acting also in the capacity of a guide for the weight.

7. In a constant pressure governor valve, a casing adapted to contain liquid in the bottom, said casing being provided with an outlet at the top and an inlet at the bottom, a plate connected with the top of said casing having an opening, and a valve seat surrounding said opening, a combined dash-plunger and weight mounted in said casing and adapted to move vertically therein, a valve member arranged on said seat, means connecting said valve member with said weight, and means for directing fluid passing said valve member to a discharge point, said means acting as said outlet.

8. A constant pressure valve, comprising a casing having an inlet at the bottom and an outlet at the top, a tubular member extending upwardly from the casing and acting as a continuation of said inlet, means carried by the casing near the upper end thereof forming a valve seat, a valve adapted to rest on said seat, a weight formed with openings therethrough provided with an annular section fitting between the casing and said tubular projection, said weight being connected with said valve, and liquid arranged in the bottom part of the casing and in the space surrounding said tubular projection whereby said weight is partially supported by said liquid and the weight acts in connection with the liquid, tubular member and casing as a dash-pot for making the action of the valve more smooth.

WILLIAM B. ENSIGN.